United States Patent [19]

Okabe et al.

[11] 3,927,177

[45] Dec. 16, 1975

[54] REMOVAL OF NITROGEN OXIDES FROM GASEOUS MIXTURES USING AQUEOUS ALKALINE MANGANATE OR PERMANGANATE SOLUTIONS

[75] Inventors: Taijiro Okabe; Akitsugu Okuwaki, both of Sendai; Shigetoshi Nakabayashi, Shinminato, all of Japan

[73] Assignees: Mitsubishi Kinzoku Kogyo Kabushiki Kaisha, Ote; Nippon Chemical Industrial Co., Ltd., Tokyo, both of Japan

[22] Filed: Oct. 5, 1973

[21] Appl. No.: 403,974

[30] Foreign Application Priority Data

Oct. 6, 1972  Japan.............................. 47-100512

[52] U.S. Cl. ................. 423/235; 423/385; 423/395
[51] Int. Cl.² .......................................... C01B 21/00
[58] Field of Search ....... 423/235, 239, 49, 50, 385, 423/395, 599

[56] References Cited
UNITED STATES PATENTS

| 2,793,112 | 5/1957 | Mancke | 423/50 |
| 2,940,821 | 7/1960 | Carus et al. | 423/599 |
| 2,940,822 | 7/1960 | Carus et al. | 423/599 |
| 3,780,158 | 12/1973 | Welsh | 423/49 |
| 3,780,159 | 12/1973 | Welsh | 423/49 |

FOREIGN PATENTS OR APPLICATIONS

| 131,460 | 1919 | United Kingdom | 423/599 |
| 219,461 | 1968 | U.S.S.R. | 423/239 |
| 226,568 | 1968 | U.S.S.R. | 423/239 |

*Primary Examiner*—Herbert T. Carter
*Assistant Examiner*—Eugene T. Wheelock
*Attorney, Agent, or Firm*—Wenderoth, Lind & Ponack

[57] ABSTRACT

Nitrogen oxides in a gaseous mixture are removed therefrom by a removal method which comprises causing the gaseous mixture to contact an absorbent comprising a manganate or a permanganate or a manganese-containing substance, which forms a manganate or a permanganate at the time of use, oxidizing manganese oxides formed at the treatment by the reduction of the manganate or permanganate with the nitrogen oxides, thereby to generate the oxy-acid salt of manganese, and circulating the same.

4 Claims, 1 Drawing Figure

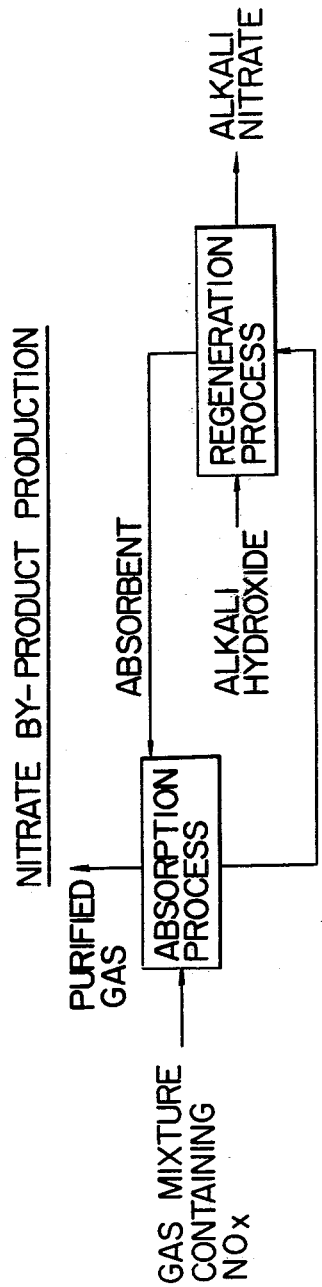
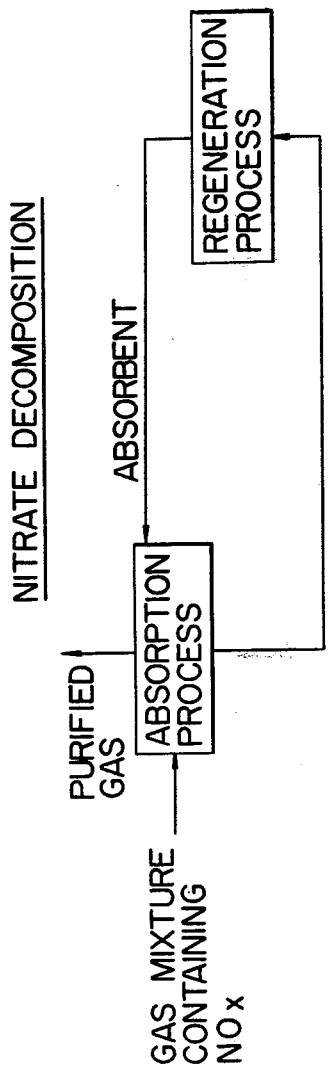

REMOVAL OF NITROGEN OXIDES FROM GASEOUS MIXTURES USING AQUEOUS ALKALINE MANGANATE OR PERMANGANATE SOLUTIONS

BACKGROUND OF THE INVENTION

This invention relates to a process for economically removing nitrogen oxides in gaseous mixtures through the use of manganates (V and VI valence salts of manganese are known and the former may also be called hypomanganate) or permanganates. The expression "(per)manganate" used herein means "a salt of oxy-acid of manganese".

The nitrogen oxides in gaseous mixtures discharged from machines and facilities such as internal combustion engines, chemical or metallurgical plants, power generation plants and buildings, gives rise to pollution such as photochemical smog and is thereby a serious social problem.

We have carried out continuous research, from the standpoint of eliminating pollution, on treatment of gaseous mixtures containing these nitrogen oxides (which, in actual practice, are principally NO and $NO_2$ and hereinafter referred to collectively as $NO_x$). As a result, we have discovered that (per)manganates, which have a powerful oxidizing property, are very effective for this purpose as demonstrated in Japanese Pat. application No. 17556/1972 (U.S. Pat. Appln. Ser. No. 332,792).

The reactions for absorbing NO and $NO_2$ through the use of (per)manganates, which are to be the basis of this invention, may be divided into the following three types.

1. NO absorption reaction with a permanganate

While this reaction is known with respect to aqueous solutions, we have previously disclosed in Japanese Patent Application No. 17556/1972 that an alkali permanganate absorbs $NO_x$ even in anhydrous solid state. The absorption reaction of NO in the case of potassium permanganate, for example, can be represented by the following Eq. (1) or (2), (2)'.

$$KMnO_4 + NO = KNO_3 + MnO_2 \qquad (1)$$
$$KMnO_4 + NO = KNO_2 + MnO_2 + \tfrac{1}{2} O_2 \qquad (2)$$
$$KMnO_4 + 3NO + 2KOH = 3KNO_2 + MnO_2 + H_2O \qquad (2)'$$

(In an aqueous solution or in the presence of moisture.)

2. NO absorption reaction with a manganate

This reaction was made clear for the first time by us as mentioned hereinabove. In the case where potassium manganate (VI) is used as a manganate, the reaction can be represented by the following Eq. (3), (3)' or (4).

$$K_2MnO_4 + 2NO + O_2 = 2KNO_3 + MnO_2 \qquad (3)$$
$$3K_2MnO_4 + 2NO + 2H_2O = 2KNO_3 + 3MnO_2 + 4KOH \qquad (3)'$$
$$K_2MnO_4 + 2NO = 2KNO_2 + MnO_2 \qquad (4)$$

3. $NO_2$ absorption reaction with a manganate or a permanganate

When potassium manganate (VI), for example, is used as a manganate, or potassium permanganate, for example, is used as a permanganate, the reaction can be represented by the following Eq. (5) or (6), (6)'.

$$K_2MnO_4 + 2NO_2 = 2KNO_3 + MnO_2 \qquad (5)$$
$$KMnO_4 + NO_2 = KNO_3 + MnO_2 + \tfrac{1}{2} O_2 \qquad (6)$$
$$KMnO_4 + 3NO_2 + 2KOH = 3KNO_3 + MnO_2 + H_2O \qquad (6)'$$

(In an aqueous solution or in the presence of moisture.)

In the case where the nitrogen oxide is only $NO_2$, there is no necessity of using the above mentioned high-priced salts possessing oxidizing property in addition to alkalinity for removing only this $NO_2$, since $NO_2$ can be readily reacted and absorbed by contact with an alkaline compound.

Accordingly, in the removal of nitrogen oxides, which is an object of this invention, on the basis of an absorption reaction as described above, the removal of NO only becomes a problem economically and technically. As a method of carrying this out in an effective manner, we have previously conceived the use of alkali (per)manganates, of the previous application.

However, as long as the above-mentioned oxy-acid salts of manganese are dependent on the present production methods, they are of high price. In a method such as that, wherein new lots of these oxy-acid salts of manganese are used each time in the treatment of gaseous mixtures containing nitrogen oxides, and the oxides of manganese thus formed are discarded, the high cost of the process materials gives rise to an increase in the treatment cost. Furthermore, the discarding of the manganese oxides gives rise to new pollution. These have been the principal difficulties restricting the use of (per)manganates.

Accordingly, it occurred to us that if it were possible to oxidize and regenerate at low cost as (per)manganates the manganese oxide (mostly in the form of manganese dioxide) formed by the reduction of the (per)manganates by the $NO_x$ in the reactions of Eqs. (1) through (6), it would be possible, by combining this regeneration reaction with the above-mentioned $NO_x$ absorption reactions, to provide a process for removing $NO_x$ which is highly economical. With this possibility and principle in view, we have carried out various studies on reactions for regenerating manganese oxides in relation to $NO_x$ absorption reactions, and as a result, have arrived at this invention.

SUMMARY OF THE INVENTION

According to this invention, briefly summarized, there is provided a process for removal of nitrogen oxides in a gaseous mixture containing the same, characterized by the steps of causing the gaseous mixture containing a nitrogen oxide to contact an absorbent comprising a manganate or a permanganate, whereby the nitrogen oxide is converted into a nitrate or a nitrite and the manganate or permanganate is converted into a manganese oxide, causing the manganese oxide to be oxidized into a manganate or permanganate and circulating the manganate or permanganate thus regenerated to the absorption step.

The nature, principle, and utility of the invention, as well as further features thereof, will be apparent from the following detailed description beginning with a consideration of general features of the invention and concluding with specific examples of practice constituting preferred embodiments of the invention.

BRIEF DESCRIPTION OF THE DRAWING

In the drawing:

FIG. 1 is a schematic flowsheet diagram indicating an example of an absorption-regeneration system according to this invention in a state for producing nitrates as a by-product; and FIG. 2 is a similar diagram indicating the system in a state for system of nitrates.

DETAILED DESCRIPTION

When the combination of the $NO_x$ absorption process step and the step for regeneration of manganese oxides is broadly divided, depending on the form of utilization of the nitrates or nitrites formed as by-products in the $NO_x$ absorption step, a system for producing nitrates as a by-product as indicated in FIG. 1 and a nitrate decomposition system as indicated in FIG. 2 result, for example, in the case of salt of an alkali metal. The invention, however, is not limited to these two systems.

The absorption step and the regeneration step in these nitrate by-product production sytem and nitrate decomposition system will now be considered in detail.

Absorption Step

The $NO_x$ absorption process step is common to both the nitrate by-production system and the nitrate decomposition system of the regeneration step, being in accordance with the above Eqs. (1) through (6) in either case.

According to the results of our studies, the degree of oxidation of $NO_x$ due to the (per)manganates, that is, whether it stops in the nitrite stage or whether it progresses further to produce nitrates, depends on the absorption temperature, the oxygen concentration in the gas, and further, in the case of an aqueous solution, on the pH value of the absorbent solution. In the case of an equeous solution, the oxidation progresses to the nitrate indicated in Eq. (1) or (3)' when the absorbent solution is neutral or on the acidic side, while a nitrite is formed in accordance with Eq. (2)' of (4) as a first stage when the solution is on the alkaline side, and this nitrite is further oxidized into the nitrate, whereby the ultimate result is a reaction according to the Eq. (1) or (3)'.

However, in the case of a dry absorption method wherein the absorbent is in a solid state, or even in the case of an aqueous solution, where absorption takes place in a region of very high content of free alkali, the rate of oxidation reaction of the nitrite into the nitrate due to the (per)manganate is considerably slow, and the nitrite is included in the absorbent in some cases. In such a case, the nitrite can be readily oxidized to form the nitrate by a measure such as electrolytic oxidization separately in an aqueous solution state. Therefore, it is also possible to utilize this property, to carry out absorption and removal of NO as the pH value of the absorbent solution is held at a high level in the aqueous solution treatment, to cause the absorption reaction to take place principally according to Eq. (2)' or (4), and to reduce the consumption of the (per)manganate per unit quantity of the NO in comparison with that in the case of Eq. (1) or (3)'.

Examples of (per)manganates suitable for use as the absorbent according to this invention are alkali metal salts such as sodium salts, potassium salts, and rubidium salts of manganic acid (V), manganic acid (VI), and permanganic acid; copper salts and silver salts; alkaline earth metal salts such as calcium salts, strontium salts, and barium salts; zinc salts and cadmium salts; and ammonium salts. Of these salts, the most representative are alkali metal salts, particularly sodium salts and potassium salts.

The oxides of nitrogen with which this invention is concerned are nitrogen monoxide (NO), dinitrogen trioxide ($N_2O_3$), nitrogen dioxide ($NO_2$), dinitrogen pentoxide ($N_2O_5$), and nitrogen trioxide. Of these oxides, NO and $NO_2$ are the most representative, and the process of this invention is most effective with respect to NO and nitrogen oxide mixtures containing NO.

A gaseous mixture containing such oxides of nitrogen to be disposed of according to this invention has a composition containing nitrogen oxides of from trace to 100 mole percent, preferably from 30 to 50,000 parts per million (ppm) as NO or $NO_2$. The composition other than nitrogen oxides, within a gaseous mixture of this character, differs with the source of the gaseous mixture, For example, in the exhaust gas of a gasoline (petrol) engine, there are of the order of from 100 to 3,000 ppm percent of $NO_x$, from 10 to 500 ppm, $SO_2$, and about 12 mole percent of $CO_2$, and CO, hydrocarbons and others. In the exhaust gas of a thermal power plant using heavy oil as fuel, there are of the order of from 100 to 800 ppm of $NO_x$, from 30 to 2,000 ppm of $SO_2$ and/or $SO_3$, and about 12 mole percent of $CO_2$ and others. In the exhaust gas of chemical plants, there are of the order of 30 to 50,000 ppm, and HCl, HF and others.

For the absorption step, any reaction process which can be adopted for gas-liquid contact reaction (in the case where the absorbent is a liquid) and gas-solid contact reaction (in the case where the absorbent is a solid) can be utilized. For example, when a gas-liquid contact reaction is carried out with a liquid absorbent, gas-liquid counterflow or parallel-flow contact can be carried out in a plate column, a bubble capa column, or a packed column containing large surface packings. As a result of the reaction, manganese oxides are separated out. Accordingly, removal or recovery of these oxides must be considered.

While any process temperature and pressure may be used, provided that the reaction can be carried out satisfactorily, the ordinarily satisfactory levels of temperature are from room temperature to 600°C, preferably from 100° to 500°C and when the absorbent is in solid form, and from 0°C to 80°C, preferably 10°C to 70°C when the absorbent is in liquid form; those of pressure are preferably from 0.95 to 10 atmospheric pressure, absolute. The pH value of the absorbent solution is of the order of from 7 to 14.

It is to be understood that the expression "an absorbent comprising a manganate or a permanganate" encompasses the absorbent which yields a manganate or a permanganate in situ at the time of the absorption step. Examples of such "precursor" of a manganate or a permanganate include mixtures of $MnO_2$ with alkali metal oxides with alkali metal hydroxides, and with salts of nitrogen oxy-acid when the absorbent is in the form of a solid. The roasted products of such mixtures contain a (per)manganate and are not the precursor but the (per)manganates per se.

In the case where the absorbent is in the form of an aqueous solution, the solution usually compries (per)manganate in 0.1 to 20% by weight, preferably 1 to 5% by weight of the solution. The solution can contain a nitrate and/or a nitrite such as an alkali metal nitrate or nitrite which may be a product of the absorption step.

In the case where the absorbent in the form of a particulate solid, which may be hydrous or anhydrous, the absorbent can comprise 10 to 100% by weight of particulate or solid (per)manganate, the remaining being inert filler or packing such as Raschig rings or a solid nitrate or nitrite.

Regeneration Step

The process for regeneration of manganese oxides will be considered separately with respect to the nitrate by-product producing method and the nitrate decomposition method.

A. Regeneration process depending on nitrate by-product production method

The regeneration step of these systems is based on a reaction for oxidizing a manganese oxide formed in the $NO_x$ absorption step with a permanganate in an aqueous solution in the presence of an alkali, thereby to form a manganate and on a reaction for oxidizing this manganate by electrolytic oxidation, oxidation with chlorine, oxidation with ozone, or some other suitable method, as indicated by the following Eqs. (7) and (8). When manganese dioxide is taken as one example of the manganese oxide, and caustic potash is specified as the alkali, and electrolytic oxidation is applied, the regeneration reaction is shown by the following formulas:

$$MnO_2 + 2KMnO_4 + 4KOH \rightarrow 3K_2MnO_4 + 2H_2O \quad (7)$$
$$2K_2MnO_4 + 2H_2O \rightarrow 2KMnO_4 + 2KOH + H_2 \uparrow \quad (8)$$

In this case, the reactivity of the manganese oxide is low for causing the above set forth reactions to take place, and the higher the alkali concentration and the reaction temperature are, the more rapid is the progress of the decomposition reaction of the permanganate indicated in the following Eq. (9), which is not desirable.

$$2KMnO_4 + 2KOH \rightarrow 2K_2MnO_4 + H_2O + \tfrac{1}{2} O_2 \uparrow \quad (9)$$

Therefore, the important point of the regeneration process of this system is to suppress to a minimum the permanganate decomposition reaction according to Eq. (9) and to use manganese dioxide of high reactivity in the oxidation reaction according to Eq. (7).

We have found that a very convenient feature of the manganese oxide formed when a gaseous mixture containing nitrogen oxides is treated with an absorbent comprising a (per)manganate, is its high activity and high reactivity in the form wherein it is coupled with water, and that, under suitable conditions, it is possible to cause selectively the reaction of only Eq. (7) to progress, that is, to oxidize selectively manganese dioxide, thereby to convert it into a manganate.

As a result, by combining this with the electrolytic oxidation of the manganate of the process presently practiced as indicated by Eq. (8), it is readily possible to convert it into the permanganate. Thus, it is possible to regenerate completely and effectively the manganese oxide formed in the NO absorption reaction as an oxyacid salt of manganese. The electrolytic oxidation of the manganate represented in Eq. (8) is being practiced at present in the process for producing potassium permanganate from manganese ore and does not entail any problems in production technology.

The regeneration by this nitrate by-product production system may be carried out by a two-process regeneration method, wherein a process for oxidizing a manganese oxide formed in the absorption process with a permanganate and another process for electrolytic oxidation of the manganate formed in the first process, are coupled in series or by a single-process regeneration method, wherein these two processes are carried out simultaneously.

More specifically, in the former two-process regeneration method, the first process comprises separating by sedimentation the manganese oxide formed in the absorption process, taking this oxide once out of the system, and oxidizing this oxide with a permanganate solution containing free alkali to convert it into a manganate solution. The second process comprises converting the manganate solution obtained in the first process by electrolytic oxidation, thereby to convert it into the permanganate. In the case where a manganate is used in the aforementioned absorption step, the oxidation of this into the permanganate is unnecessary.

The objective process in the case of the latter single-process regeneration method is limited to a wet absorption of NO in which an absorbent in an aqueous solution is used. For this purpose there are two methods. One includes an absorption step and comprises holding the concentration, alkalinity, and temperature of the alkali permanganate within suitable ranges within an absorption apparatus, oxidizing the manganese oxide formed by the absorption by means of a permanganate into a manganate, and, oxidizing this manganate by ordinary electrolytic oxidation thereby to regenerate the same into the permangante. The other method comprises taking the absorption solution out of the apparatus, and carrying out concurrently within the regeneration apparatus both of oxidation with a permanganate of the manganese oxide into a manganate and electrolytic oxidation of the resulting manganate.

Thus, as described above, the manganese oxide formed in the absorption process step can be effectively and completely regenerated as (per)manganates.

On one hand, in the case of dry method wherein the absorbent is used in a solid state for the disposal of the $NO_x$, the absorbent is treated with water into an aqueous solution of the nitrate. In the case of wet method wherein the absorbent is used as an aqueous solution, the manganese oxide is separated, leaving the aqueous solution containing principally the nitrate. Furthermore, in the case where these aqueous solutions contain a nitrite, they are subjected to a process such as electrolytic oxidation, thereby to convert all of the nitrite into the nitrate, and then can be recovered as by-product in a desired form.

The permanganate to be used in this process step can be suitably selected from the permanganates enumerated hereinbefore in terms of the absorbent. Preferable ones are alkali permanganates, particularly sodium permanganate and potassium permanganate. Examples of alkalis are hydroxides and oxides of alkali metals. While the reaction conditions of the oxidation due to the permanganate may be freely selected, provided that the desired reaction can be carried out, these conditions are ordinarily a concentration of the manganese oxide dispersion of the order of from 0.01 to 10 percent by weight, a pH value of the order of from 12 to 14, a permanganate concentration higher than the stoichiometric quantity, and a reaction temperature of the order of from 40° to 200°C.

The oxidation of the manganate formed by oxidation by means of the permanganate can be accomplished by any suitable method such as electrolytic oxidation, chlorine oxidation, or ozone oxidation. While the reaction conditions of these oxidation methods may be selected at will, provided that the desired oxidation can be accomplished, they are ordinarily, for example, in electrolytic oxidation a temperature of the order of from 40° to 100°C, an anode current density of the order of from 0.001 to 0.02 A/cm², a cathode current density of the order of from 0.1 to 1 a/cm², a terminal voltage of the order of from 2 to 3.2 V. In chlorine oxidation, chlorine gas is blown into the manganate solution at a temperature ordinarily of the order of from 60° to 130°C.

B. Regeneration depending on nitrate decomposition method

The regeneration process depending on this method in the case of dry method, comprises merely heating of the absorbent. In the case of potassium nitrate, for example, potassium manganate is effectively regenerated by a roasting reaction according to the following Eq. (10).

$$MnO_2 + 2KNO_3 = K_2MnO_4 + N_2 + 2O_2 \quad (10)$$

In the case of wet treatment, a slurry containing the nitrate and the manganese oxide formed in the step of absorbing the gas containing $NO_x$ is first dehydrated and solidified, and then roasting regeneration is carried out similarly as described above. It is possible to leach the product of the above-mentioned roasting with a dilute aqueous solution of an alkali, thereby to obtain a manganate solution or, further, to carry out electrolytic oxidation of this solution, thereby to obtain the permanganate.

Thus, by combining a regeneration process as described above and a $NO_x$ absorption process depending on an absorbent comprising a (per)manganate as described hereinbefore, there is established a process for absorbing and removing $NO_x$ in a gaseous mixture containing the $NO_x$ according to the nitrate decomposition method. In the regeneration by the nitrate by-production method, the entire alkali content is replenished as an alkali hydroxide, and a nitrate is produced as a by-product, while in the regeneration by the nitrate decomposition method, an alkali hydroxide is not replenished, but the nitrate produced as a by-product is utilized to regenerate a (per)manganate. By either one of these methods the regeneration can be accomplished readily and $NO_x$ removal can thus be effected at low cost.

The aforementioned roasting reaction of the manganese oxide and nitrate (the cations constituting the salt are selected from the aforementioned group with respect to the cations constituting the (per)manganate) is carried out with suitable proportions of the two reactants, for example, with the stoichiometric ratio or with an excess of one reactant, at a temperature of the order of from 300° to 800°C, and ordinarily in air. By carrying out this roasting reaction in the presence of a hydroxide or oxide of an alkali metal, it is possible to cause this reaction to resemble a reaction included in the presently practiced production of alkali permanganate.

As described above, the manganese oxide formed in the absorption process can be regenerated effectively and completed as (per)manganates. Therefore, by circulating and utilizing the (per)manganates regenerated at low cost from manganese oxide by any of these regeneration processes, a great reduction in material cost can be attained.

In accordance with this invention as described above, by combining a process for absorbing $NO_x$ in a gaseous mixture containing the $NO_x$ by means of (per)manganates and a process for regeneration of the manganese oxide formed in the absorption process as a manganate, there is provided a highly economical process for removing $NO_x$, which is also extremely useful in the solution of polution problems.

In order to indicate still more fully the nature and utility of this invention, the following specific examples of practice thereof are set forth, it being understood that these examples are presented as illustrative only and that they are not intended to limit the scope of the invention.

EXAMPLE 1

With the use of a column packed with tellerette packings manufactured by Nittetu Chemical Engineering Ltd., Japan, of an inner diameter of 250 mm and a packed layer length of 4,000 mm, a 5 percent aqueous solution of potassium manganate at 60°C containing 5 percent of caustic potash and 10 percent of potassium nitrate, was introduced for irrigation as an absorption agent at a rate of 8 m³/m² hr, and air containing 1,060 ppm of $NO_x$ (1,040 ppm of which was NO) was introduced at a gas velocity of 0.35 m/sec to carry out absorption. As a result, the removal of NO in continuous absorption was 92 percent. After further continuous operation, and at the stage where a noticeable quantity of a manganese oxide was formed, this was sampled and analyzed, whereupon its composition was found to be as follows:

| Moisture content in cake | Principal composition of anhydride | |
|---|---|---|
| $H_2O$ | $T.MnO_2$ | $K_2O$ |
| 60.7% | 70.4% | 21.0% |

The mother liquor from which the manganese oxide was removed was concentrated, cooled, and the precipitated potassium nitrate was separated. The potassium nitrate thus produced was mixed with the above-mentioned manganese oxide in a range of $KNO_3/MnO_2$ mole ratio of from 2 to 3, and the resulting mixture was dried at 110°C.

This mixture was transferred to a steel rotary drum of external heating type of 150 mm diameter and 600 mm length, heated to 700°C, and caused to react. Successively, damp air, which had been decarbonated and saturated with water at 60°C was introduced, to react and at the same time the drum was cooled to 350°C, whereupon the following results were obtained;

| $KNO_3/MnO_2$ mole ratio | Temp. (°C) | Time (min.) | Temp. (°C) | Time (min.) | Yield of oxyacid salt of manganese (%) |
|---|---|---|---|---|---|
| 2 | 700 | 60 | 350 | 60 | 25.4 |
| 3 | 700 | 120 | 350 | 60 | 37.8 |
| 3 | 700 | 180 | 350 | 60 | 45.1 |

The fired substance obtained from the above reaction was mixed into an absorption solution from which potassium nitrate had been separated, and which had been heated to 60°C, and the resulting mixture was again returned to the absorption system, where the absorption test was carried out under the same conditions. As a result, the removal of NO in absorption was found to be 92 percent.

EXAMPLE 2

The absorption operation was carried out under the same conditions as in Example 1. The manganese oxide thus formed is separated out and mixed with potassium permanganate with a $KMnO_4/MnO_2$ mole ratio of from 1 to 4. The resulting mixture was added to a caustic potash solution of a concentration of from 30 to 55 percent maintained at a temperature of 60°C, and reaction was carried with agitation, whereupon the following results were obtained:

| KOH (%) | $KMnO_4/MnO_2$ (mole/ratio) | Reaction time (min.) | Yield of oxy-acid salt of manganese (%) |
|---|---|---|---|
| 30 | 3.9 | 180 | 97 |
| 40 | 3.0 | 180 | 86 |
| 40 | 1.0 | 180 | 31 |
| 55 | 3.2 | 180 | 92 |

The above products of reaction were left standing to cause potassium (per)manganate containing some manganese oxide to precipitate, and this was mixed with a mother liquor from which manganese oxide and, further, potassium nitrate had been separated. Then the absorption experiment was carried out again, whereupon it was found that the removal of No was 90 percent.

EXAMPLE 3

With the use of a solution containing 2.0 percent of potassium permanganate, 2.5 percent of potassium manganate, and 6 percent of caustic potash, a gas absorption operation was carried out under the same conditions as in Example 1, whereupon a NO absorption rate of 91 percent was attained.

The manganese oxide formed in this absorption operation was separated and rendered into the permanganate under the same conditions as in Example 2, and a solution of the manganese oxy-acid salt was prepared as follows.

| $K_2MnO_4$ | KOH |
|---|---|
| 5% | 5% |

This solution was transferred to an electrolytic bath of a diameter of 800 mm and a depth of 400 mm and adjusted in temperature to 60°C. Then, electrolysis was carried out for 12 hours with a nickel plate used for the anode and an iron bar used for the cathode and with an anode current density of 0.008 $A/cm^2$, a cathode current density of 0.4 $A/cm^2$, a terminal voltage of 3 V, and a current of 100 A. As a result, an electrolytic oxidation rate of 50 percent was attained.

With the use of this solution of an alkali (per)manganate containing potassium permanganate, the absorption experiment was carried out again, whereupon a NO removal of 91 percent was attained.

What we claim is:

1. A process for the removal of nitrogen oxides from a gaseous mixture containing such nitrogen oxides which comprises the steps of
   1. contacting a gaseous mixture containing nitrogen oxide with an aqueous absorbent solution at a solution temperature of 0°C to 80°C, said aqueous absorbent solution consisting essentially of 0.1 to 20% by weight of a manganate or a permanganate of sodium or potassium, whereby the nitrogen oxides are absorbed into said aqueous absorbent solution and converted into a nitrate or nitrite and wherein the manganate or permanganate is converted into a manganese oxide,
   2. separating the manganese oxide from the absorbent solution,
   3. subjecting the manganese oxide to oxidation along with at least a stoichiometric amount of a nitrate by roasting in air at a temperature of 300° to 800°C to convert the manganese oxide into a manganate or permanganate, and
   4. circulating the manganate or permanganate thus-regenerated to step 1.

2. A process for the removal of nitrogen oxides from a gaseous mixture containing such nitrogen oxides which comprises the steps of
   1. contacting a gaseous mixture containing nitrogen oxides with an aqueous absorbent solution at a solution temperature of 0°C to 80°C, said aqueous absorbent solution consisting essentially of 0.1 to 20% by weight of a manganate or a permanganate of sodium or potassium, whereby the nitrogen oxides are absorbed into said aqueous absorbent solution and converted into a nitrate or a nitrite and wherein the manganate or permanganate is converted into a manganese oxide;
   2. separating the manganese oxide from the absorbent solution;
   3. subjecting the manganese oxide to oxidation wherein the manganese oxide is oxidized with an alkaline aqueous permanganate solution to produce a manganate, and
   4. circulating the manganate thus regenerated to step 1.

3. A process for the removal of nitrogen oxides from a gaseous mixture containing such nitrogen oxides which comprises the steps of
   1. contacting a gaseous mixture containing nitrogen oxides with an aqueous absorbent solution at a solution temperature of 0° to 80°C, said aqueous absorbent solution consisting essentially of 0.1 to 20% by weight of a manganate or a permanganate of sodium or potassium, whereby the nitrogen oxides are absorbed into said aqueous absorbent solution and converted into a nitrate or a nitrite and wherein the manganate or permanganate is converted into a manganese oxide;
   2. separating the manganese oxide from the absorbent solution;
   3. subjecting the manganese oxide to oxidation wherein the manganese oxide is oxidized with an alkaline aqueous permanganate solution to produce a manganate and the manganate thus produced is then subjected to electrolytic oxidation to produce a permanganate; and
   4. circulating the permanganate thus regenerated to step 1.

4. A process for removal of nitrogen oxides as claimed in claim 1 in which said nitrate used in step 3 is a product of said absorption of step 1.

* * * * *

UNITED STATES PATENT OFFICE
CERTIFICATE OF CORRECTION

Patent No. 3,927,177             Dated December 16, 1975

Inventor(s) Taijiro Okabe; Akitsugu Okuwaki and Shigetoshi Nakabayashi

It is certified that error appears in the above-identified patent and that said Letters Patent are hereby corrected as shown below:

First page, in the line designated "[73]" relating to the assignee's name, change "Mitsubishi Kinzoku Kogyo Kabushiki Kaisha" to -- Mitsubishi Kinzoku Kabishiki Kaisha --.

Signed and Sealed this thirtieth Day of March 1976

[SEAL]

Attest:

RUTH C. MASON  
*Attesting Officer*

C. MARSHALL DANN  
*Commissioner of Patents and Trademarks*